Dec. 30, 1930.  C. E. STEERE  1,787,217

AUTOMATIC TIMING MECHANISM

Filed Oct. 5, 1929    2 Sheets-Sheet 1

Inventor
Clarence E. Steere
Attorney

Dec. 30, 1930.  C. E. STEERE  1,787,217
AUTOMATIC TIMING MECHANISM
Filed Oct. 5, 1929  2 Sheets-Sheet 2
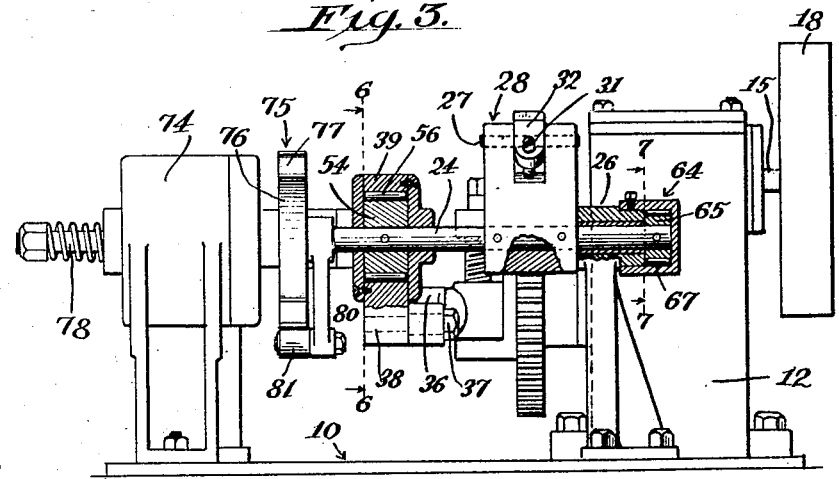
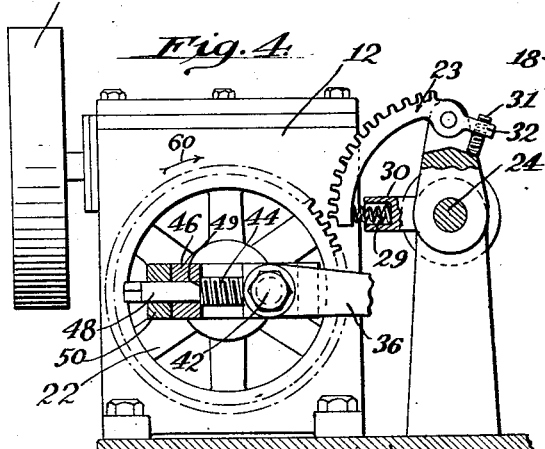
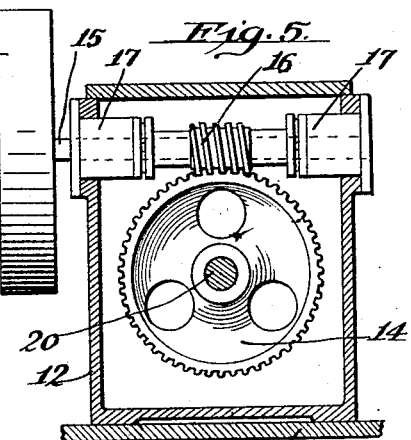
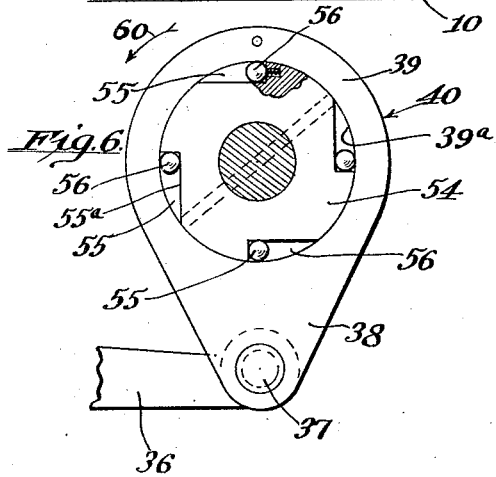
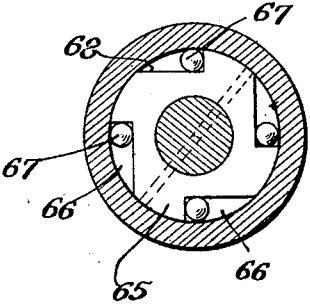
Inventor
Clarence E. Steere
Attorney Patented Dec. 30, 1930

1,787,217

UNITED STATES PATENT OFFICE

CLARENCE E. STEERE, OF LOS ANGELES, CALIFORNIA

AUTOMATIC TIMING MECHANISM

Application filed October 5, 1929. Serial No. 397,544.

The object of this invention is to provide a mechanism adapted to give motion at regular intervals to devices or mechanisms requiring timed operations.

Other objects and advantages will be apparent from the description of the accompanying drawings, in which:

Fig. 3 is a side elevation of the timing mechanism taken in the direction indicated by the arrow 3 of Fig. 1, parts being broken away and shown in section;

Fig. 4 is a sectional view taken on line 4—4 of Fig. 1;

Fig. 5 is a sectional view taken on line 5—5 of Fig. 1;

Fig. 6 is a detail section taken on line 6—6 of Fig. 3;

Fig. 7 is a detail section taken on line 7—7 of Fig. 3.

Figure 1:
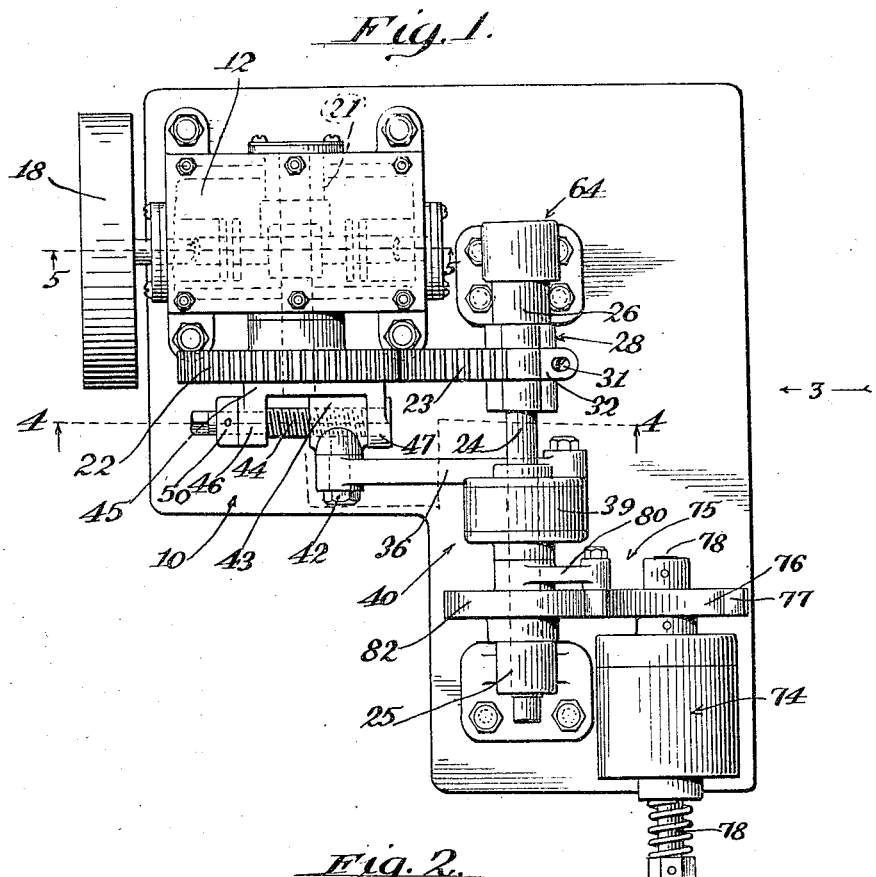
Fig. 1 is a top plan view of the timing mechanism.
Figure 2:
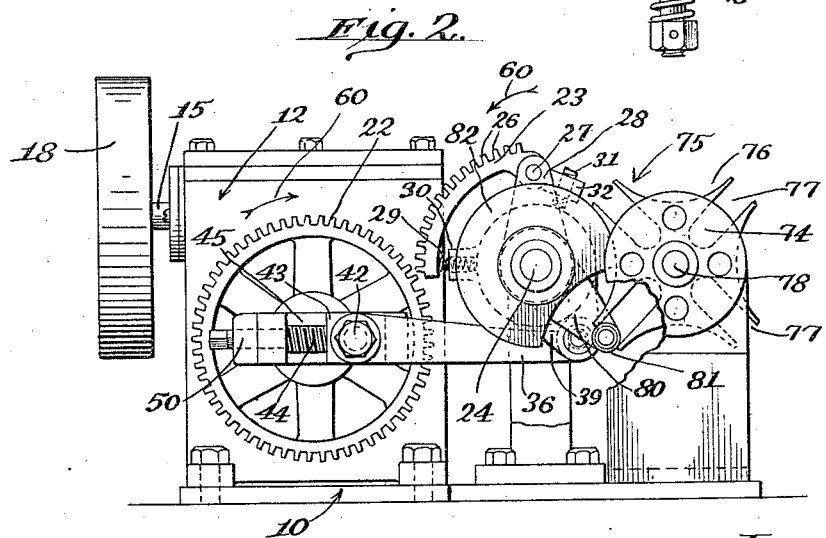
Fig. 2 is a front elevation of the timing mechanism.

Referring by numerals to the drawings, 10 designates a base upon which is mounted case 12 which serves to carry a reduction gear consisting of a worm wheel 14 meshing with a worm gear 16 secured to a shaft 15 mounted in bearings 17 and driven by a pulley 18 or if desired by a direct motor drive. The worm wheel is secured to a shaft 20 mounted in bearings 21 one end of which projects beyond the case and carries a spur gear 22 keyed or otherwise secured thereto.

Rotation of the gear 22 is constant and it is adapted to mesh with a segmental gear 23 indirectly connected to a shaft 24 mounted in bearings 25 and 26 secured to the base 10. One end of the segmental gear is connected by a pin 27 to an arm 28 mounted on the shaft 24, the other end being urged outwardly by an expansion coil spring 29 resting in an opening in a lug 30 and is adjustable on the arm by a screw 31 threaded into an opening in an ear 32 formed on its end. The screw prevents the coil spring from forcing the segment outwardly beyond the pitch circle of the gear 22, the spring yielding enough to permit slipping of one tooth should the teeth fail to mesh on first engagement.

Motion is transmitted to the shaft 24 from the gear 22 by a connecting rod 36 one end of which is connected by a pin 37 to an arm 38 formed on the ring 39 of a roller ratchet 40, the other end being mounted on a crank pin 42 screw threaded into a block 43 on a screw carried by a bracket 45 secured to or formed integral with the gear 22. The screw 44 is adapted to increase or diminish the throw of the crank pin 42 and has plain ends extending into openings in ears 46 and 47 formed on the bracket, one end of the screw being of a reduced diameter as indicated at 48 forming a shoulder 44 engaging the ear 46 and is held in place by set collar 50.

The roller ratchet 40 is of usual construction and consists of a wheel 54 having a plurality of indents 55 is which are mounted rollers 56 engaging the inner surface 39$^a$ of the ring 39 and the tangential surfaces 55$^a$ of the indents.

From the foregoing it will be seen that oscillating movement is transmitted to the ring 39 from the gear 22 by the connecting rod, the shaft 24 and segment being moved a fraction of a revolution in the direction indicated by the arrow 60 during each revolution of the gear 22 due to the wedging action of the rollers 56 in the indents, the roller releasing on opposite or return movement of the ring.

In order to hold the shaft 24 against rotation on return movement of the ring 39 a roller clutch 64 is provided and consists of a disk 65 secured to the shaft, the disk having a plurality of indents 66 in which are mounted rollers 67 engaging tangential faces 68 of the indents and the inner surface of the cap 70 secured to the outer end of the bearing 26.

From the construction it will be seen that during operation of the parts above described the segment will eventually mesh with the gear at which time shafts 20 and 24 will rotate at a uniform speed until the segment is again out of mesh, viz., after its teeth have passed over a corresponding number of teeth on the gear. Thus it will be seen that the shaft 24 is moved step by step except during the time when the teeth of the gear and segment are in mesh, thereby resulting in a quick movement of the shaft 24 at regular intervals, the movement of which may be employed to operate any mechanism requiring timed operations.

The interval between meshing of the gear and segment may be varied by adjusting the block 43 on the screw 44, for instance when the crank pin 42 is in its extreme position (as shown on the annexed drawings) the maximum number of engagements between the gear 22 and segment 23 will be effected, by moving the block inwardly toward the center of the shaft 22 the number of such engagements may be reduced due to shortening the throw of the crank pin.

The timing mechanism is shown operating a four way valve generally designated at 74 through a Geneva gear 75 consisting of a wheel 76 secured to the valve stem 78. An arm 80 is secured to the shaft 24 and carries a roller 81 adapted to actuate the wheel by passing through the slots, the wheel being held against rotation between movement of the arm by the usual stop member 82.

I claim:

1. A device of the character described comprising a gear, means for rotating said gear, a shaft, a segmental gear on said shaft, a ratchet on said shaft, and means for actuating said ratchet from said gear to bring said segment into mesh with the gear.

2. A device of the character described comprising a gear, means for rotating said gear, a shaft mounted in bearings, an arm secured to said shaft, a segmental gear yieldingly mounted on said arm, a ratchet on said shaft, and a rod pivotally connected to said gear and said ratchet adapted to actuate said ratchet on rotation of said gear to bring said segmental gear into mesh with said gear.

3. A device of the character described comprising a gear, means for rotating said gear, a shaft parallel with the axis of said gear, an arm secured to said shaft, a segmental gear, one end of said gear pivotally mounted on said arm, an expansion spring engaging the other end of said segmental gear and urging it outwardly, a screw on said segmental gear for adjusting the position of said segmental gear, a ratchet on said shaft, a rod, a pin connecting one end of said rod to said gear, and a pin connecting the other end of said rod to said ratchet.

4. A device of the character described comprising a gear, a shaft, an arm on said shaft, a segmental gear mounted on said arm, a ratchet on said shaft, a block slidably mounted on said gear, a rod, a crank pin connecting one end of said rod to said block, a pin connecting the other end of the rod to the shifting member of said ratchet, means for adjusting the position of said block, and a clutch for holding said shaft against rotation during movement of the shifting member of said ratchet in one direction.

In testimony whereof I affix my signature.

CLARENCE E. STEERE.